United States Patent [19]
Yan

[11] Patent Number: 6,079,632
[45] Date of Patent: Jun. 27, 2000

[54] COMPREHENSIVE PRODUCT DELIVERY SYSTEM

[75] Inventor: Jianhua Yan, Prior Lake, Minn.

[73] Assignee: Ag-Chem Equipment Company, Inc., Minnetonka, Minn.

[21] Appl. No.: 08/756,406

[22] Filed: Nov. 26, 1996

Related U.S. Application Data

[63] Continuation-in-part of application No. 08/500,598, Jul. 11, 1995, abandoned.

[51] Int. Cl.$^7$ .................................................... B05B 7/28
[52] U.S. Cl. .......................... 239/1; 239/156; 239/172; 141/382
[58] Field of Search .................................... 141/382, 383; 239/148, 155, 156, 161, 172, 318, 310, 302

[56] References Cited

U.S. PATENT DOCUMENTS

| | | |
|---|---|---|
| 1,144,868 | 6/1915 | Roy . |
| 1,195,915 | 8/1916 | Damrow . |
| 2,154,647 | 4/1939 | West ..................................... 141/382 X |
| 2,302,799 | 11/1942 | Peterson ..................................... 299/84 |
| 2,670,874 | 3/1954 | Wilkerson ........................... 141/383 X |
| 2,757,044 | 7/1956 | Gerbracht ................................... 299/43 |
| 3,186,607 | 6/1965 | Lubenow ................................. 222/547 |
| 3,770,198 | 11/1973 | Mihara ..................................... 239/10 |
| 3,782,634 | 1/1974 | Herman ................................... 239/156 |
| 3,976,087 | 8/1976 | Bolton et al. .............................. 137/15 |
| 3,976,110 | 8/1976 | White ...................................... 141/382 |
| 4,052,003 | 10/1977 | Steffen ..................................... 239/71 |
| 4,220,998 | 9/1980 | Kays ....................................... 364/510 |
| 4,270,576 | 6/1981 | Takeda et al. ........................... 137/888 |
| 4,277,022 | 7/1981 | Holdsworth et al. ...................... 239/7 |
| 4,392,611 | 7/1983 | Bachman et al. ......................... 239/74 |
| 4,467,961 | 8/1984 | Coffee et al. ............................... 239/1 |
| 4,553,702 | 11/1985 | Coffee et al. ............................ 239/690 |
| 4,580,721 | 4/1986 | Coffee et al. ....................... 239/172 X |
| 4,633,909 | 1/1987 | Louboutin et al. ..................... 137/888 |
| 4,637,547 | 1/1987 | Hiniker et al. ............................. 239/1 |
| 4,714,196 | 12/1987 | McEachern et al. ..................... 239/62 |
| 4,785,958 | 11/1988 | Snyder ................................... 220/5 A |
| 4,803,626 | 2/1989 | Bachman et al. .................. 364/424.07 |
| 4,840,284 | 6/1989 | Snyder ................................... 220/5 A |
| 4,865,255 | 9/1989 | Luvisotto ................................ 239/149 |
| 4,886,208 | 12/1989 | Strand ..................................... 239/77 |
| 4,895,303 | 1/1990 | Freyvogel ............................... 239/61 |
| 4,925,096 | 5/1990 | Gill .......................................... 239/10 |
| 4,932,232 | 6/1990 | Ballyns et al. ........................... 72/201 |
| 4,967,957 | 11/1990 | Bachman ................................. 239/62 |

(List continued on next page.)

FOREIGN PATENT DOCUMENTS

| | | |
|---|---|---|
| 1 419 215 | 9/1965 | France . |
| 4 025 943 | 9/1992 | Germany ............................... 239/172 |
| 63014 | 11/1940 | Norway .................................. 137/888 |
| 2 205 052 | 11/1988 | United Kingdom . |

OTHER PUBLICATIONS

Tuthill Corp.—Fill–Rite Division Product Brochure for Surestop Dry Disconnect Device, at least as of Jul. 11, 1995.
"Kuker" Catalogue, Jan. 11, 1980, p. 25; Kuker Indus., Inc., Box 12035, Florance Sta, Omaha. Nebraska 68112.
Injection Closed System Sprayers, A.J. Landers *Pesticide Outlook*, vol. 1, 1989.

*Primary Examiner*—Kevin Weldon
*Attorney, Agent, or Firm*—Larkin, Hoffman, Daly & Lindgren, Ltd.

[57] ABSTRACT

A comprehesive product dispensing system including a product/carrier dispensing system. The product carrier dispensing system comprising a carrier dispensing system and a product dispensing system. The product dispensing system including a product dispensing device and a product dispensing control system. The product dispensing control system includes a flowmeter and a controller. The controller regulates the injection rate of product injected into the carrier and the flowmeter provides feedback to the controller for regulating the injection rate of product. Product is dispensed from product containers which may be filled via a closed transfer delivery system for safe product handling and transfer.

4 Claims, 14 Drawing Sheets

U.S. PATENT DOCUMENTS

| | | | |
|---|---|---|---|
| 5,016,817 | 5/1991 | Ghate et al. | 239/113 |
| 5,033,398 | 7/1991 | Colburn, Jr. | 111/118 |
| 5,076,497 | 12/1991 | Rabitsch | 239/310 |
| 5,077,653 | 12/1991 | Barlet | 364/167.01 |
| 5,105,843 | 4/1992 | Condron et al. | 137/13 |
| 5,170,820 | 12/1992 | Jones | 137/899 |
| 5,199,570 | 4/1993 | McKenzie | 206/503 |
| 5,207,352 | 5/1993 | Porter et al. | 222/1 |
| 5,249,684 | 10/1993 | Sterett | 206/503 |
| 5,260,875 | 11/1993 | Tofte et al. | 364/424.07 |
| 5,310,113 | 5/1994 | Cowgur | 239/10 |
| 5,314,120 | 5/1994 | Nau et al. | 239/310 |
| 5,340,210 | 8/1994 | Patel et al. | 366/132 |
| 5,453,924 | 9/1995 | Monson et al. | 364/131 |
| 5,520,333 | 5/1996 | Tofte | 239/10 |

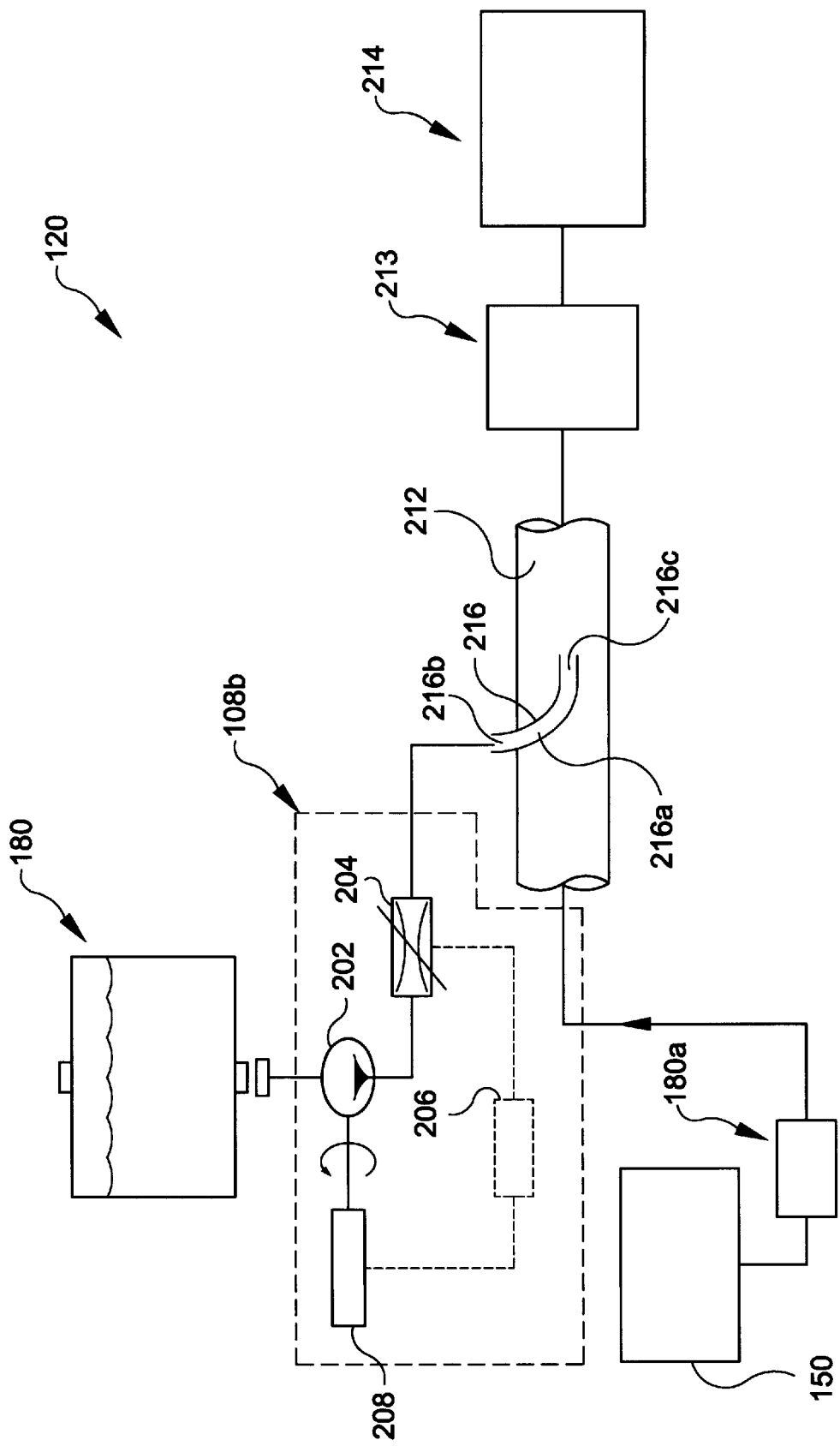

COMPREHENSIVE PRODUCT DELIVERY SYSTEM

This is a Continuation-In-Part of Application Ser. No. 08/500,598, filed Jul. 11, 1995 and now abandoned.

BACKGROUND OF THE INVENTION

1. Field of the Invention

The present invention relates generally to a comprehensive product, e.g. chemical delivery system, and more particularly to a product delivery system which will allow product applicators to safely deliver concentrated products, e.g. chemical(s) from a bulk tank(s) to a field without tank mixing the concentrated product(s) with a carrier product.

2. Description of the Prior Art

The present state of the art regarding design of liquid application systems can be categorized as either 1) open tank mixing of concentrated products and carrier product(s) in the main product tank, or 2) direct injection of concentrated product(s) at some point in the carrier or boom plumbing. These existing concepts generally utilize some form of control system to apply a product/carrier mixture at a pre-selected, constant application rate based on the ground speed of the vehicle used in the application. A common problem that arises in these known systems is the lack of any accurate or reliable feedback from the chemical pump to the control system to allow for making adjustments to accommodate changing vehicle speeds. There is also no provision for variable rate application, or variable blend (fragmented application based on map input(s)).

Open tank mixing of the concentrated product/carrier mixture presents certain problems to the applicator in that the main product tank is continuously exposed to various brands and concentrations of products which introduces the possibility of residual product(s) remaining behind when using a new product, e.g. chemical. Additionally, once the concentrated product is diluted in the carrier mixture, it becomes unassailable at a later date should the applicator not be able to deliver the mixture due to weather, equipment problems, etc. The complete product tank at this point (usually 500 gallons or more) becomes hazardous waste. The product filling process during an open tank mixing operation also involves open product containers which pose potential safety and liability issues.

Direct injection utilizing permanent 'on-board' concentrated product tanks also poses potential contamination problems. Although there is no dilution of the concentrated product until it is introduced into the boom plumbing, the permanent product tanks are still used to contain multiple product brands which introduces the possibility of leaching or residual chemical(s). The need for rinsing creates problems, especially when the machine is still in the field, to safely dispose of the residue. This is a very undesirable characteristic because product tanks that are not thoroughly cleaned will contain residue which can accidentally be mixed with a non-compatible product causing crop damage and/or environment hazards.

It is therefore desirable to provide a product delivery system which overcomes the shortcomings of present product delivery systems, as described hereinbefore. The present invention is one such system, and which entails a comprehensive, closed transfer product delivery system (Total Application Logistics Operating Network) which allows product applicators to safely deliver product(s) from the bulk tank to the field without tank mixing the concentrated product with the carrier product (water, liquid fertilizer, etc.).

U.S. Pat. No. 5,340,210, issued to Patel et al. on Aug. 23, 1994, *Apparatus For Blending Chemicals With A Reversible Multi-Speed Pump*, discloses an apparatus for blending chemicals in a blending vat, similar to the open tank product mixing system described hereinbefore, and having many of the attendant disadvantages normally associated with such known mixing systems.

U.S. Pat. No. 5,310,113, issued to Cowgur on May 10, 1994, *Sprayer Control System And Method For Using Same*, discloses a sprayer control system and method for using a pump for directing a mixture of chemical and fluid carrier to a flow control valve, utilizing a flow control valve and associated flow control sensor, similar to the direct injection systems described hereinbefore, and having many of the attendant disadvantages normally associated with such known systems.

U.S. Pat. No. 5,278,4232, issued to Wangler et al. on Jan. 11, 1994, *Object Sensor And Method For Use In Controlling An Agricultural Sprayer*, discloses a sensor and method for determining the presence and size of foliage, such as trees or row crops, for purposes of spraying, counting or measuring the size of the foliage, but does not disclose apparatus or methods for overcoming many of the attendant disadvantages normally associated with either open tank mixing or direct product injection systems recited hereinbefore.

U.S. Pat. No. 5,033,397, issued to Colburn, Jr. on Jul. 23, 1991, *Soil Chemical Sensor And Precision Agricultural Chemical Delivery System And Method*, discloses a real time soil chemical sensor and precision agricultural chemical delivery system including a plurality of ground-engaging tools in association with individual soil sensors which measure soil chemical levels, but does not disclose apparatus or methods for overcoming many of the attendant disadvantages normally associated with either open tank product mixing or direct injection systems recited hereinbefore.

U.S. Pat. No. 4,714,196, issued to McEachern et al. on Dec. 22, 1987, *Farm Chemical Delivery System*, discloses a fluid delivery system for delivering at least one chemical onto a field in a desired concentration, but does not disclose apparatus or methods for overcoming many of the attendant disadvantages normally associated with either open tank product mixing or direct product injection systems recited hereinbefore.

U.S. Pat. No. Re 31,023, issued to Hall, III on Sep. 7, 1982, *Highly Automated Agricultural Production System*, discloses a fluid delivery subsystem of the open tank chemical mixing variety disclosed hereinbefore, and has many of the attendant disadvantages recited above normally associated with those known systems.

SUMMARY OF THE INVENTION

A comprehensive product dispensing system including a product/carrier dispensing system. The product carrier dispensing system comprising a carrier dispensing system and a product dispensing system. The product dispensing system including a product dispensing device and a product dispensing control system. The product dispensing control system includes a flowmeter and a controller. The controller regulates the injection rate of product injected into the carrier and the flowmeter provides feedback to the controller for regulating the injection rate of product.

Product is dispensed from product containers which may be filled via a closed transfer delivery system for safe product handling and transfer. In a preferred embodiment of the present invention, product from a product container is injected into a product/carrier dispensing line for dispensing via a spray boom. The product is injected into the product/carrier dispensing line via an injection tube. The injection tube includes an inlet and an outlet. The inlet is aligned relative to the flow stream of product and the outlet is aligned to inject product parallel to the flow of carrier through the product/carrier dispensing line.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein:

FIG. 2 is a block diagram depicting one preferred embodiment for a product/carrier mixing and dispensing assembly for use with the present inventive comprehensive product delivery system;

FIG. 4b is a side view of the closed transfer product shuttle tank illustrated in FIG. 4a;

DETAILED DESCRIPTION OF THE PREFERRED EMBODIMENT

The preferred embodiment of the present invention described as follows, addresses the considerable problems associated with present product delivery systems, including those product delivery systems utilizing open tank mixing of concentrated products and carrier products, as well as direct injection of concentrated products.

Figure 1:
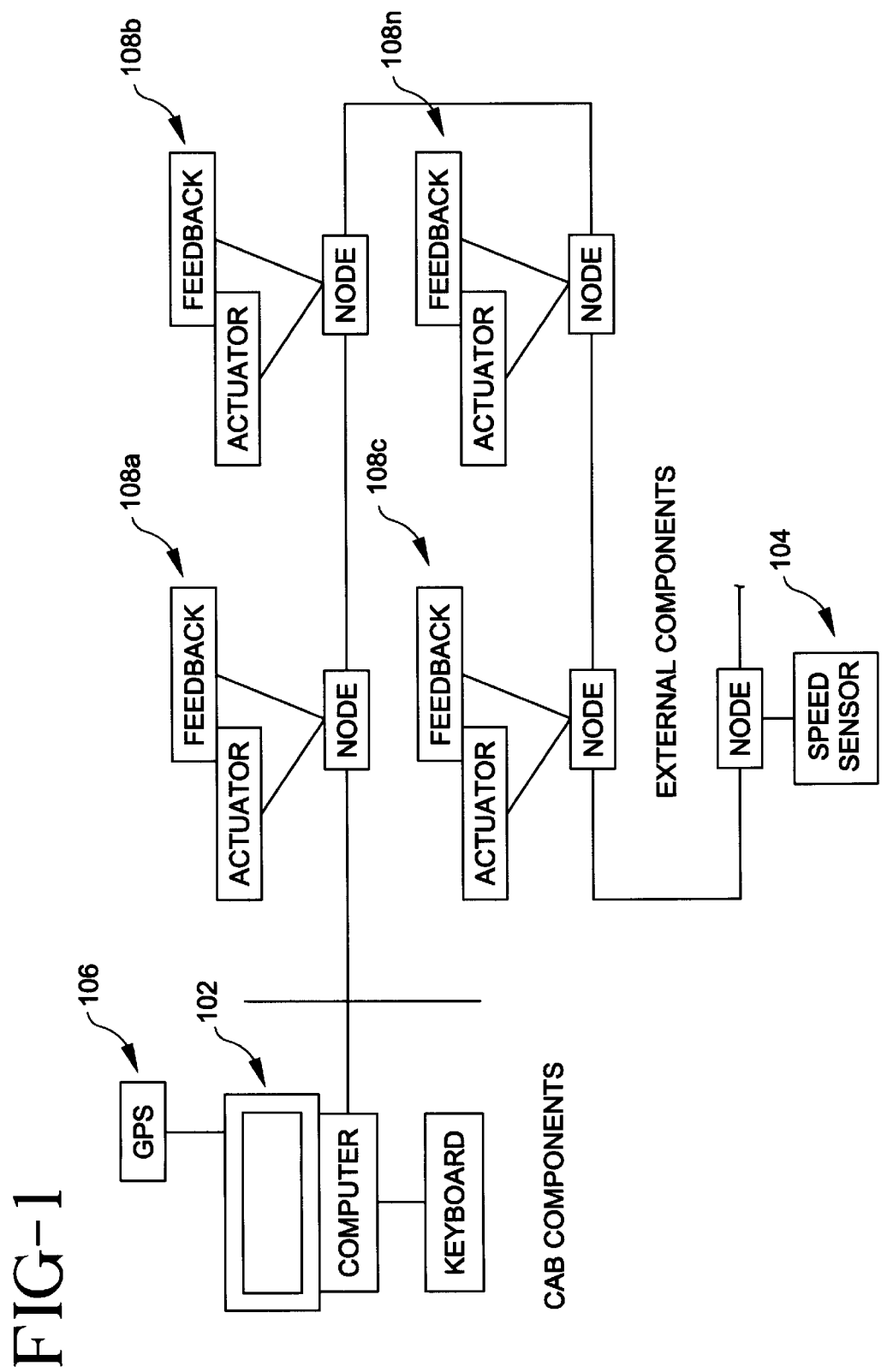
FIG. 1 is a block diagram illustrating one preferred embodiment for a distributed network control system such as that disclosed in U.S. Pat. No. 5,453,924, suitable for use with the present inventive comprehensive product delivery system.

Looking now at FIG. 1, a block diagram illustrates one embodiment for a distributed network control system 100 suitable for use with the present inventive comprehensive product delivery system. One such control system has been disclosed in U.S. Pat. No. 5,453,924 referenced hereinbefore. The use of a distributed network control system 100 will greatly simplify the concept and enhance the overall system performance for the present invention by creating a system that is easily expandable and upgradeable. Thus, a system operator may choose as few as one loop or as many as desired in the case of multiple or fragmented product delivery requirements. The single loop unit will not in any way be incurring incidental costs or complexities associated with the multi-loop unit.

Use of a distributed network control system 100 enhances product application by providing the system with the ability to control pre-plant, pre-emerge, and post emerge products in accordance with an on-board digital field map based on soil samples or pest surveys. Generally, the vehicle position will be inputted to an on-board computer either via a Global Positioning Satellite signal or by simple dead-reckoning. The distributed network includes a central control assembly 102 for monitoring and controlling operation of a product dispensing system according to the present invention. Preferably, the central control assembly 102 is coupled to a speed sensor 104 and global positioning system 106 for regulating product application rates via application maps. The central control assembly 102 is coupled to a GPS positioning system for site specific dispensing applications. Dispensing systems 108 control individual product dispensing and are coupled to the central control assembly 102 for operating instructions. The dispensing systems 108 are coupled to the contral control assembly 102 via a network communication system as disclosed in U.S. Pat. No. 5,453,924.

Moving now to FIG. 2, there is illustrated one preferred embodiment of an advanced response dispensing system suitable for use with the present invention. The advanced response dispensing system is preferably composed of a product/carrier dispensing system 120 for mixing a dispensing chemical with a carrier and dispensing the carrier/product mixture. The product may be any liquid chemical application product, such as a liquid fertilizer or other agricultural product. The product is combined or mixed with a carrier, such as water to dispense the product to a field.

The product/carrier mixing and dispensing system 120 includes a carrier container 150, carrier dispensing system 180a and a product container 180 and a product dispensing system 180b. Although only one product system is shown it should be understood that multiple product dispensing systems 108c–n may be used to dispense multiple products. As shown, the dispensing systems 108a–b are linked via a network system 100 to the central control assembly 102. Application rates of products may be varied based upon application maps which contain dispensing rates by location. Instructions from the application maps are communicated via the central control assembly 102 to the product dispensing systems 108b–n for variable rate application based upon location. The carrier dispensing system 180a and product dispensing systems 108b–n both regulate dispensing rates based upon vehicle speed.

The product injection system or dispensing 108b preferably utilizes a high precision diaphragm pump 202 having three separate and distinct diaphragms to reduce pulsation and increase resolution. The pump 202 is preferably a self-priming system which is directly driven by a 12 volt DC motor 208 which in turn is preferably controlled by a pulse width modulated (PWM) motor controller 206. Diaphragm pump 202 provides optimal efficiency in pumping chemical (s) through a working pressure section which is completely isolated from the remaining pump's 202 mechanical components via three robust diaphragms, not illustrated for clarity and simplicity. Preferably, pump 202 diaphragms are manufactured from a tough, chemical-resistant material for long service life. It is also preferable that diaphragm pump 202 be completely serviceable by the system operator. It will be appreciated by those skilled in the art that a diaphragm pump 202 is much more accurate in delivery over a wide range of product viscosity than conventional piston plunger or peristaltic pumps. The carrier dispensing system 108a can be any known dispensing system presently used by those skilled in the art for metering carrier dispensing rate.

The product dispensing system 108b also preferably includes in-line product metering, e.g. flowmeter 204 for real-time dynamic product flow control. It will be appreciated by those skilled in the art that such real-time dynamic product flow control is the first of its kind to be employed in a product dispensing system. This feature plays a major role in the present inventive system's ability to accurately deliver feedback to a control loop within distributed network control system 100. It will be appreciated that each product loop has its own metering device 204. This feedback mode is greatly enhanced by the PWM motor controller's 206 ability to react quickly and accurately. Preferably, the system 120 operator is also notified immediately in the case of loss of product flow. Use of a flowmeter 204 provides more accurate blending of product with a carrier since flow rate can be precisely controlled and changes in product mixture rates due to change in product characteristics, such a viscosity can be reduced. The pump motor 208 and pump 202 form the product dispensing device. The flowmeter 204, controller 206 and pump motor 208 form the product dispensing control system for controlling the product injection rate into the carrier.

Fluid from the carrier supply container 150 and product container 180 are supplied to a product/carrier dispensing line 212 to be dispensed via a dispersing apparatus 214. The product/carrier dispensing line 212 is a tubular member. Carrier is first supplied to the product/carrier dispensing line 212. Product from the product container 180 is injected into the product/carrier dispensing line 212 via an injection tube 216. As shown, injection tube 216 includes a conduit 216a, an inlet 216b and an outlet 216c and is coupled to the product/carrier dispensing line 212.

The inlet 216b is aligned relative to the flow of product into the conduit of the injection tube 216 and outlet 216c is positioned within an inner conduit of the product/carrier dispensing line 212 in alignment with the general flow direction of carrier through the inner conduit of the product/carrier dispensing line 212. The outlet 216c is aligned relative to a centerline position of the conduit of the product/carrier dispensing line 212. As shown, preferably, the inlet 216b and outlet 216c are positioned at a 90 degree angle relative to one another to position the inlet 216b in alignment with the flow of product into the conduit of the injection tube 216 and position the outlet 216c within the product/carrier dispensing line 212 in alignment with flow direction of fluid therethrough and the centerline of the product/carrier dispensing line 212 to assure complete mixing as will be described.

Figure 3A:
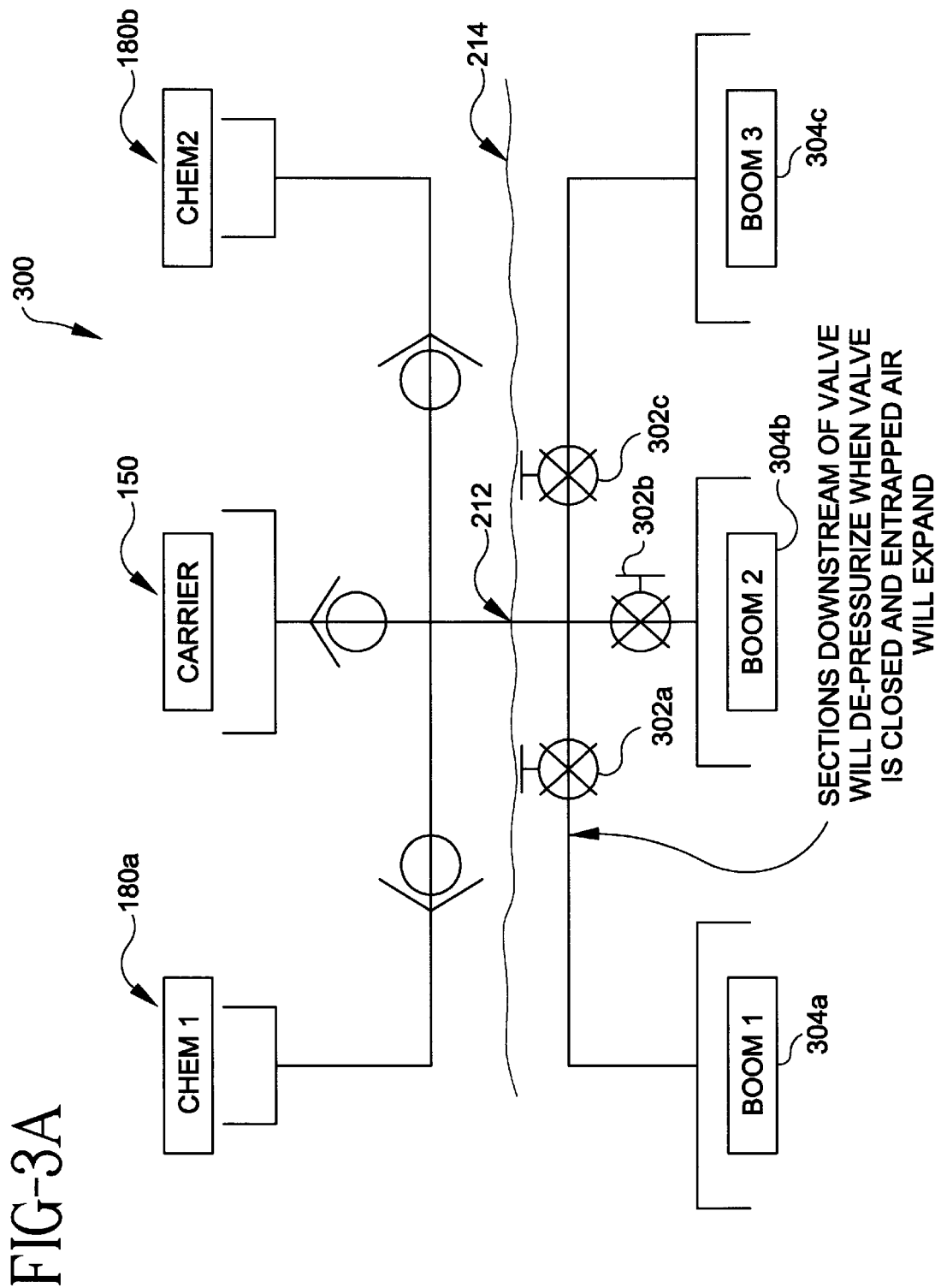
FIG. 3a is a schematic diagram illustrating one embodiment for a conventional liquid spray boom.
Figure 3B:
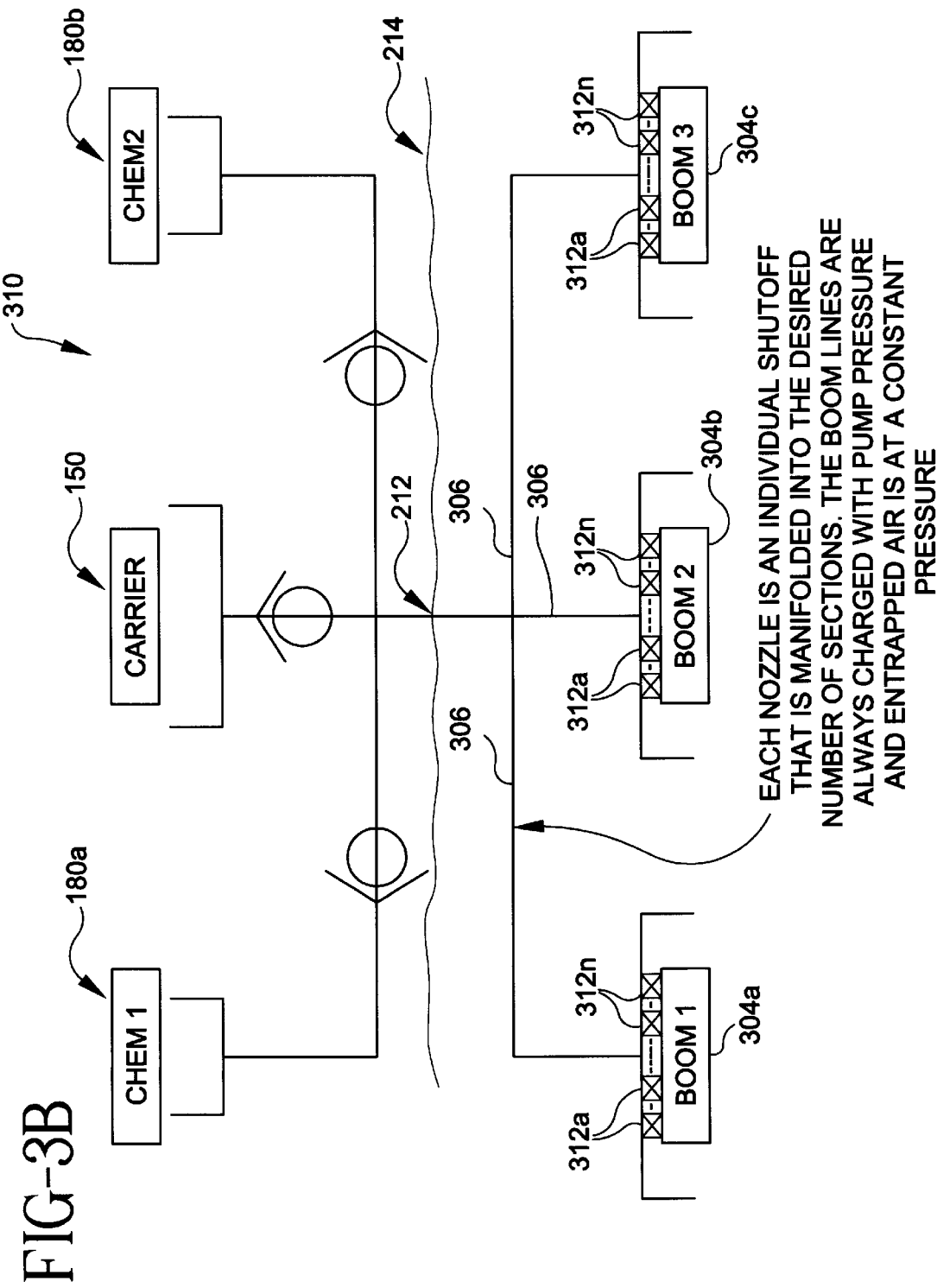
FIG. 3b is a schematic diagram illustrating one preferred embodiment for a pre-charged liquid spray boom, suitable for use with the present inventive product delivery system.

FIG. 3a illustrates a liquid spray boom shut-off system 300 generally known to those skilled in the art for a boom dispensing apparatus. Typically, in a conventional boom shut-off system 300, individual boom sections 304a–c are controlled via in-line valves 302a–c. It is known to those skilled in the art that any air trapped in the spray boom sections 304a–c downstream of valves 302a–c, will expand and compress while using a conventional boom shut-off system 300. It is virtually impossible to eliminate all air trapped in a liquid system boom. This expansion and compression results in undesirable effects and inefficient lag time when the boom sections 304a–c are turned on. Such undesirable effects are eliminated with the present invention by providing a pre-charged liquid spray boom shut-off system 310 such as illustrated in FIG. 3b. In FIG. 3b, each boom section 304a–c includes a plurality of individual shut-off nozzles 312a–n. Each nozzle 312 includes an individually controlled dispensing valve (not shown) for on/off control of nozzles 312. In this manner, each boom line 306 remains charged with current pump pressure and entrapped air remains at a constant pressure, thereby eliminating the expansion and compression, and also effectively eliminating system lag when the respective boom section 304a–c are turned on.

Additionally individual nozzles 312a–n may be shut off independently of other nozzles if the nozzles 312a–n are not used for spraying. In particular suppose on a first pass of a field, it is desired to spread product the width of a boom assembly using boom sections 304a–c for maximum field coverage. However, in a subsequent pass, it is not necessary to spread fluid the entire width of the boom assembly. To limit spread width, individual nozzles 312a–n are closed via the dispensing valves (not shown). In particular at the edge of a field, the user may choose to shut off nozzles 312a–n of boom section 304c since operations of these nozzles is not necessary since field width is smaller than boom width.

Preferably, the valves of the individual nozzles 312a–n are coupled to the central control assembly 102 as shown in FIG. 1. The central control assembly 102 calculates the number of nozzle 312a–n of the boom sections 304a–c which are open and adjusts the flow rate of carrier and product to be dispensed via the carrier dispensing assembly 180a and the product dispensing systems 180b–n to adjust for the number of nozzles 312a–n open. In particular, the central control assembly 102 is coupled to controller 206 via a network assembly to regulate the rate of motor 208 to regulate the desire dispensing rate of product from the product container 180 and coupled to the carrier dispensing assembly 108a to regulate the carrier dispensing rate, based upon the dispensing width desired.

It should be noted that carrier dispensing rate is constant based upon the number of nozzles and vehicle speed to assure adequate spread pressure for dispensing product, i.e. the dispensing rate of the carrier does not vary based upon location. It should be noted that each of the valves (not shown) of nozzles 312a–n of boom sections 304a–c may be controlled via individual dispensing systems 108, having local feedback and control features, coupled to the central control assembly 102. This may be particularly useful where selective flow rate valves are employed and thus, individual nozzles 312a–n have variable rate flow control as well as on/off flow control. Variable rate flow control for individual nozzles 312a–n is useful for providing different application rates of materials along the extent of the boom width.

Operators of mobile crop spraying equipment require a system to safely transfer and apply agricultural products in the field. A durable linear polyethylene family of product tanks is needed to fill the gap between what product, e.g. chemical companies use as packaging and what the equipment operators need as a medium to transport the product(s) through the field on-board a crop sprayer. Any shuttle tank system must have the capability to adapt to any form of product packaging for effective closed transfer of the product which dramatically reduces the risk of incidental product contact by the system operator. Preferably, the tanks will also be designed to have the ability to be dedicated on one specific product for a given period of time (determined by the operator) so the tank will only be rinsed periodically under controlled conditions.

Figure 4B:
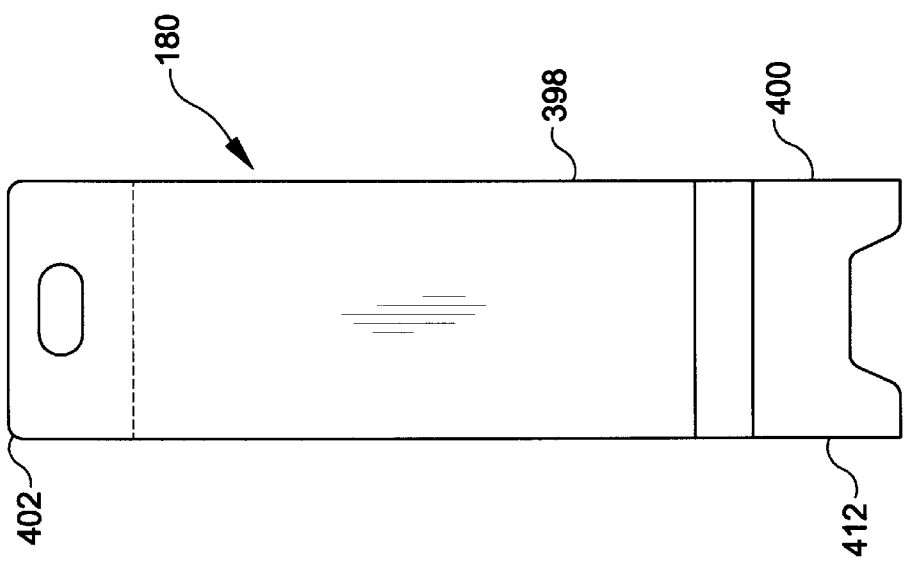
Figure 4A:
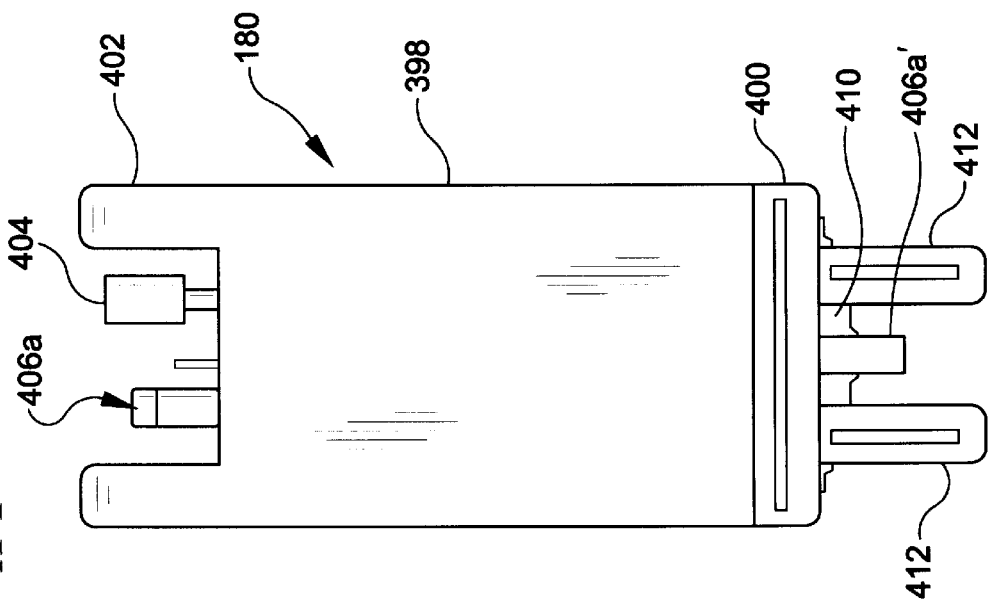
FIG. 4a is a front view of one preferred embodiment of a closed transfer product shuttle tank, suitable for use with the present inventive product delivery system.

FIG. 4a illustrates one preferred embodiment for a closed transfer product shuttle tank or product container 180 for use with the present invention. The present inventive product delivery system utilizes a unique design polyethylene product shuttle tank 180 to carry the product(s) through a field on-board a product application vehicle (not illustrated). It will be appreciated that multiple tanks and tank sizes can be used. Each tank 180 preferably has the same cross section and different sizes will vary in height only. In this manner, all such tanks 180 will then be able to be mounted on the same tank cradle or stand on the vehicle. Preferably, shuttle tanks 180 will be color-coded to allow the product applicator to match tank quantities and sizes with specific product labels via color codes based on demand of a particular product type at any point in the application season. This color-coded feature allows the applicator flexibility in designing their own shuttle tank 180 network and revising this design at any point. Typically, tanks 180 would then be thoroughly rinsed under controlled conditions at the end of the season, if necessary. FIG. 4b illustrates a side elevational view of a shuttle tank 180 depicting additional tank 180 features.

A preferred embodiment of container 180 is illustrated in FIGS. 4A and 4B and includes a main portion 398 and base portion 400. As shown, the main portion 398 includes an inner cavity for storing product (not visible in FIGS. 4A & 4B). The main portion 398 also includes handles 402 for transport, an agitator 404, an upper coupler 406a, a lower coupler 406a' and a sump 410. The agitator 404 is used to mix product and is coupled to the inner cavity of the container. The sump 410 is positioned at a lower portion of the main portion 398 so that fluid in the container collects within sump 410. The container 180 is coupled to a product source via the upper coupler 406a as will be described. Fluid is dispensed from the container 180 via the lower coupler 406a' which is connected to the sump 410 of the container 180. As shown, the sump 410 is essentially formed of a sloped base surface that directs fluid to a center position of a lower portion of the container for discharge. Fluid is dispensed from the container 180 via the dispensing system 108a coupled to the lower coupler 406a'. The base 400 of the container 180 detachably connects to the main portion 398 and includes legs 412 to support the main portion 398 of the container 180.

As the custom application industry is called upon to become the primary administrator of agricultural products, it becomes increasingly important that the custom applicator be afforded a safe, simple and reliable system to deliver these products to the field. By providing these product applicators a completely closed-transfer product fill, along with dramatic injection and control system advances, the present inventive system brings product application technology to a previously unrealized level of safety and precision within the industry.

Mobile crop spraying equipment manufacturers are in a position where they must now depend on the product companies to package the product (agricultural chemicals, pesticides, etc.) in such a manner that the end user, e.g. equipment operator has a safe, easy way to transfer the product from the factory packaging to the mobile equipment for end use. It will be appreciated by those skilled in the art that this is rarely the case. Due to the extreme variety of products and pesticides, for example, available on the market and the wide variety of equipment manufactured to apply these products, a wide gap exists in the ability of equipment manufacturers or product companies to allow for the safe transfer and application of agricultural products. The present invention preferably utilizes a dedicated, reusable shuttle tank network to fill the gap between the important packaging and marketing strategies of the product companies and the ability of the equipment operator to safely deliver the product to the field. The equipment operators and manufacturers will no longer depend on the product companies to conform to any certain packaging criteria, yet retain the ability to run a completely closed-transfer operation from the bulk tank to the field.

Figure 5A:
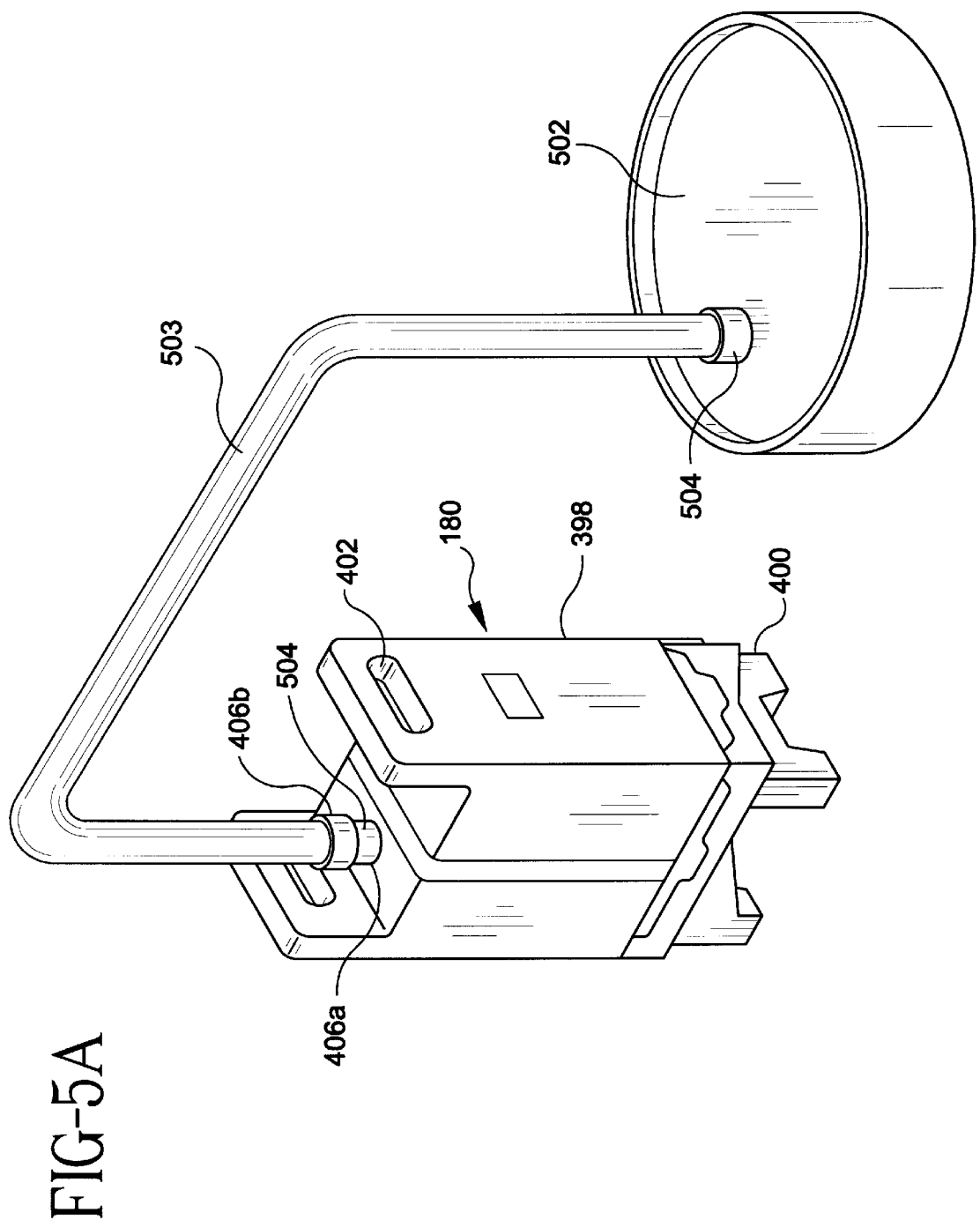
FIG. 5A is an illustration depicting operation of the closed transfer system for a product container shown in FIGS. 4a and 4b, where product or transferred media are completely closed to the atmosphere.

Moving now to FIG. 5A, one preferred embodiment illustrating use of the inventive closed transfer system for filling product container 180. As shown, the closed transfer system includes a product source 502 and a product delivery line 503. The product delivery source 502 is sealably coupled to the product delivery line 503 via a coupler assembly 504 incorporating the "no-leak" couplers as will be described. The product delivery line 503 is coupled to the container 180 via a coupler assembly 504 as will be described. The coupler assemblies 504 include first and second couplers 406a and 406b which are selectively secured to form the coupler assembly 504. Coupler 406a is secured relative to the container 180 and coupler 406b is secured relative to an end of the product delivery line 503. The coupler assembly 504 of the product source 502 and product delivery line 503 may be similarly formed as that described for the coupler assembly 504 between the product delivery line 503 and container 180.

Figure 5B:
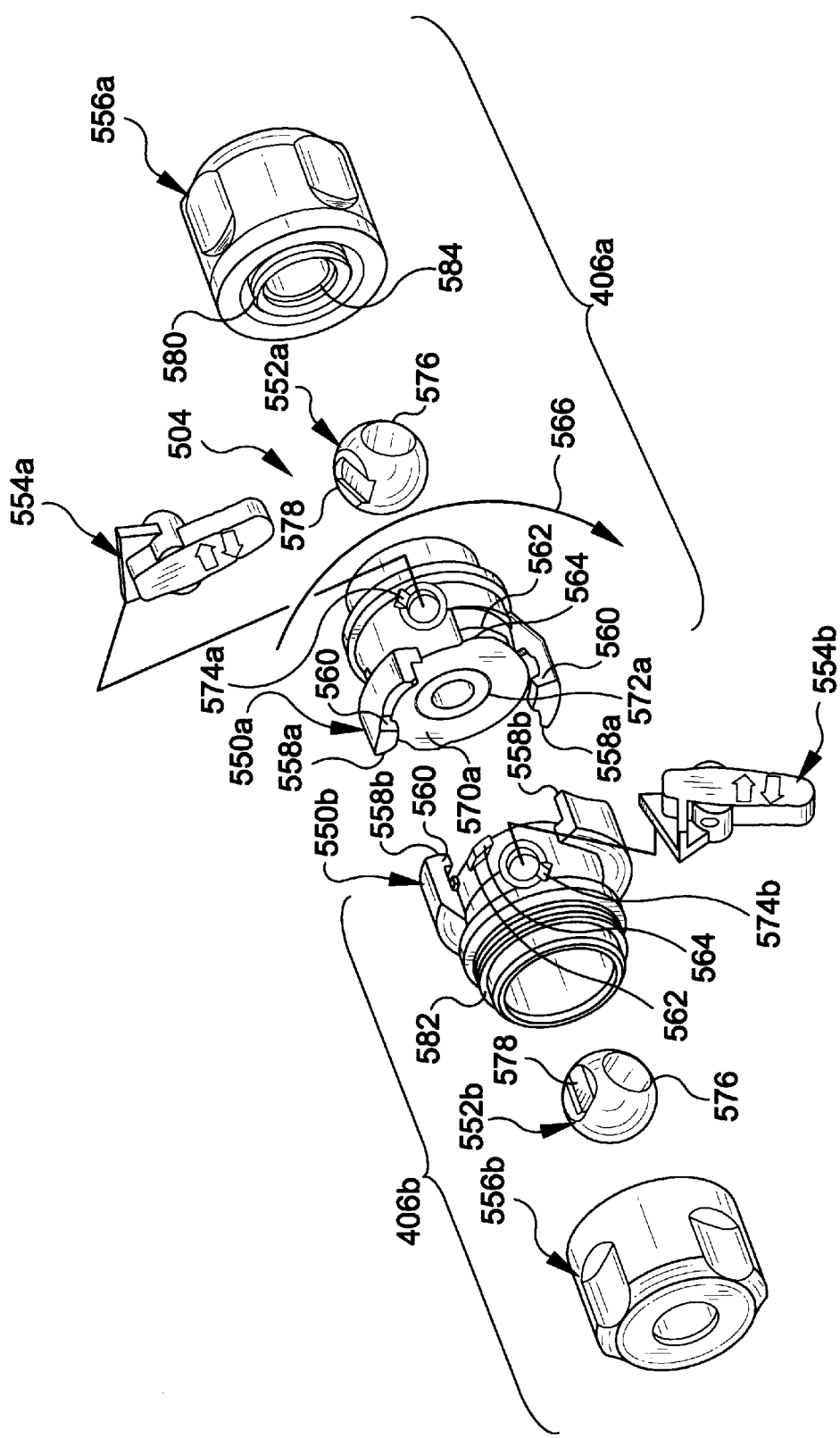
FIG. 5B is an exploded view of a coupler assembly for use in the closed transfer system of the present invention.

FIG. 5B is an exploded view of a coupler assembly 504 of the closed product delivery system of the present invention including couplers 406a and 406b. Couplers 406a and 406b include coupler housings 550a–b, valves 552a–b, valve control members 554a–b and end caps 556a–b, respectively. Coupler housings 550a–b include coupling members 558a–b for selectively securing coupler housings 550a and 550b. The coupling members 558a–b extend from the coupling housings 550a–b, respectively at spaced locations and include lips 560 forming a U-shaped groove along an extent of the coupling members. The coupler housings 550a–b also include coupling channels 562 at spaced locations. The coupling channels 562 include tongues 564 along a portion of the coupling channels 562 to define an open portion of the coupling channels and a closed portion of the coupling channels 562 adjacent the tongues 564. The tongues 564 are designed to fit into the U-shaped grooves formed by the lips 560 of the coupling members 558a–b.

To attach couplers 406a and 406b, the lips 560 of the coupling members 558 are aligned with an open portion of the coupling channels 562 of adjacent couplers 406a and 406b. The couplers 406a and 406b are pushed together until the lips 560 of the coupling members 558 abut a rear surface of the coupling channels 562 of adjacent couplers 406a–b. The couplers 406a and 406b are then rotated as illustrated by arrow 566 to align lips 560 relative to the closed end of the coupling channel 562. Thus, the lips 560 of couplers 406a–b are aligned relative to the tongues 564 of adjacent couplers 406a–b such that the couplers cannot be pulled apart. To separate the couplers 406*a* and 406*b*, the couplers 406*a* and 406*b* are rotated in the opposite direction of arrow 566 so that the lips 560 of the coupling members 558*a–b* are located at the open ends of the coupling channels 562*a–b* of adjacent couplers.

The coupler housing 550*a–b* also include coupling faces 570*a–b* (570*b*, not visible in FIG. 5B), coupler openings 572*a–b* (570*b* not visible in FIG. 5B) and valve control member insertion bores 574*a–b* for insertion of the valve control members 554*a–b*. Valves 552*a–b* are used to selectively seal coupler openings 572*a* and 572*b*. The valves 552*a–b* include valve bores 576 and control member slots 578. The valve bores 576 are selectively aligned relative to the coupler openings 572 to selectively open and close the couplers 406*a* and 406*b* to fluid delivery. The valve bore 572 is selectively aligned via the valve control member 554 operably coupled to the valve 552 via the control member slot 578. End caps 556 retain the valves 552 within the coupler housings 550. The end caps 556 include a threaded channel 580 which detachable connects to a threaded extension 582 of the coupler housing 550. As shown, end cap 556*a* includes an internally threaded bore 584 for attaching end cap 556*a* and coupler 406*a* to a threaded lip (not shown) of container 180. End cap 556*b* is coupled to the product delivery line or hose 503 by suitable means.

Figure 5C:
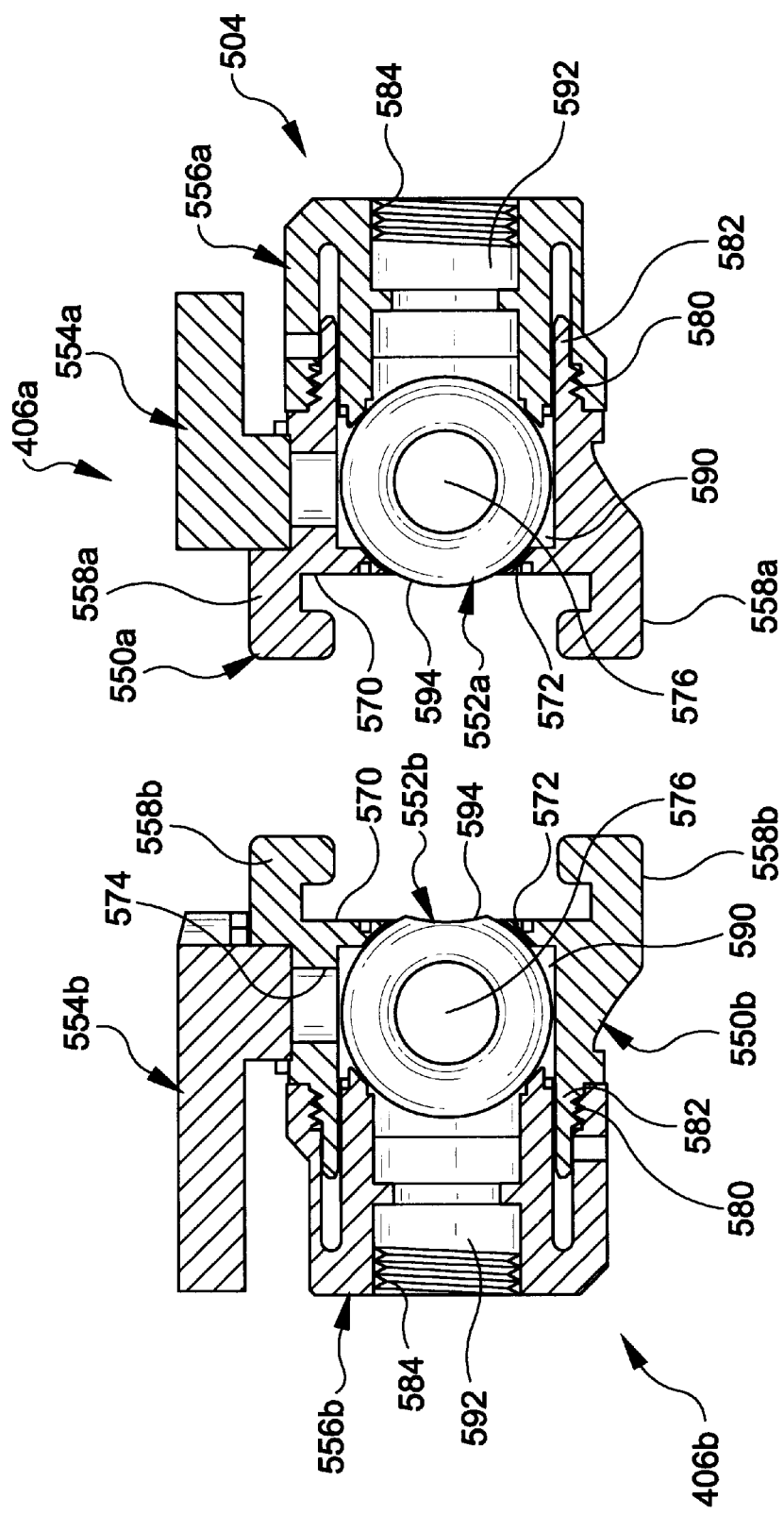
FIG. 5C is a sectional view of couplers of a coupler assembly shown detached and in a closed position.
Figure 5D:
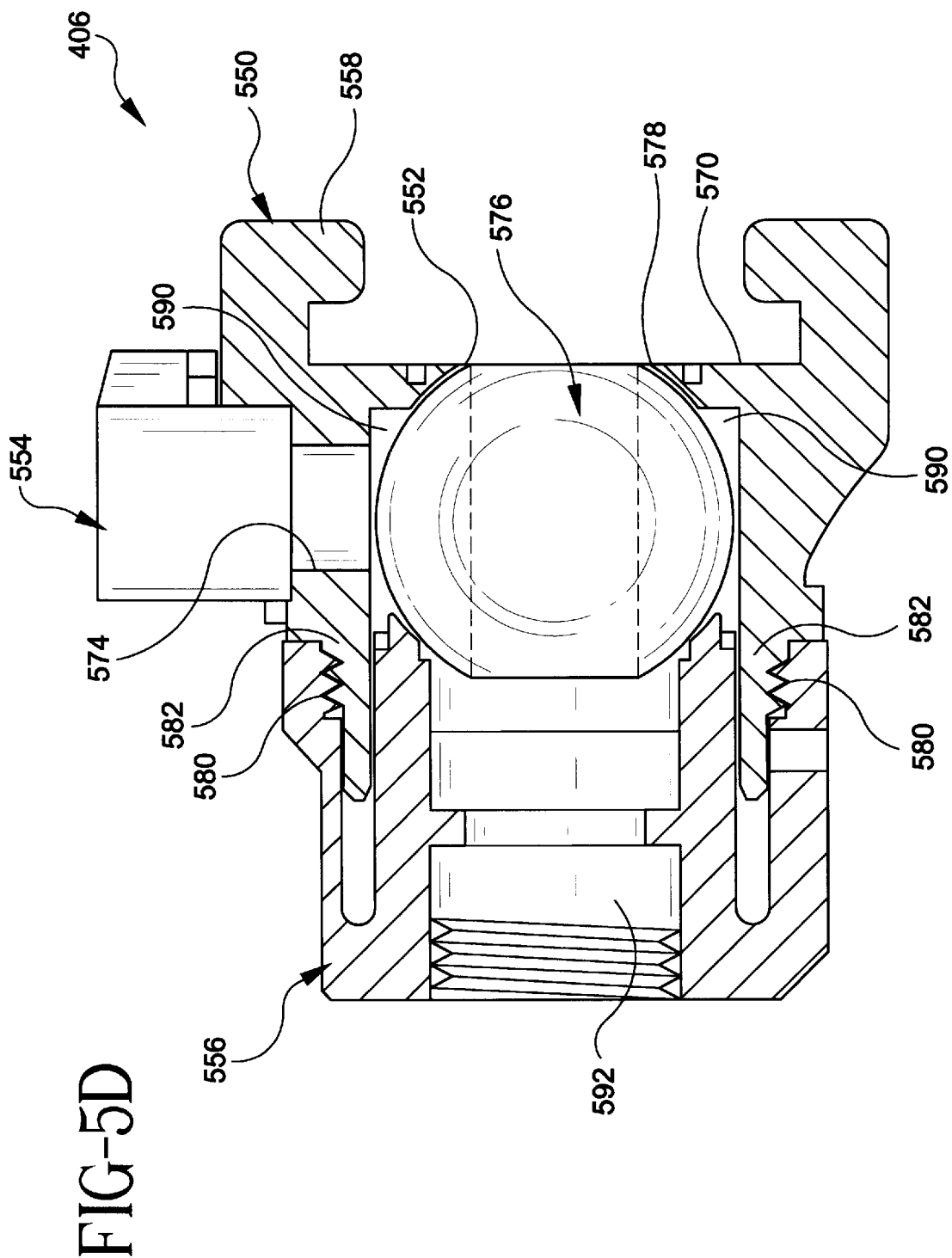
FIG. 5D is a sectional view of a coupler shown in the opened position for allowing the flow of fluid therethrough.

FIG. 5C shows detached couplers 406*a* and 406*b* in a closed position, with the valves 552 limiting the flow of fluid through coupler openings 572 and FIG. 5D illustrates a couple 406 with the valve 554 in the opened position to allow the flow of fluid therethrough. As shown in FIG. 5C valves 552*a–b* rotate within a valve chamber 590*a–b* of the coupler housing 550*a–b* between the opened and closed position. End caps 556*a–b* secure the valves 552*a–b* within the valve chamber 586*a–b* and include a through bore 592 coupled to the valve chamber 590*a–b*. As shown in the closed position of FIG. 5C, the valves 552*a–b* blocks the passage of fluid through the valve chamber 590 to seal the coupler 406*a–b*.

Figure 5E:
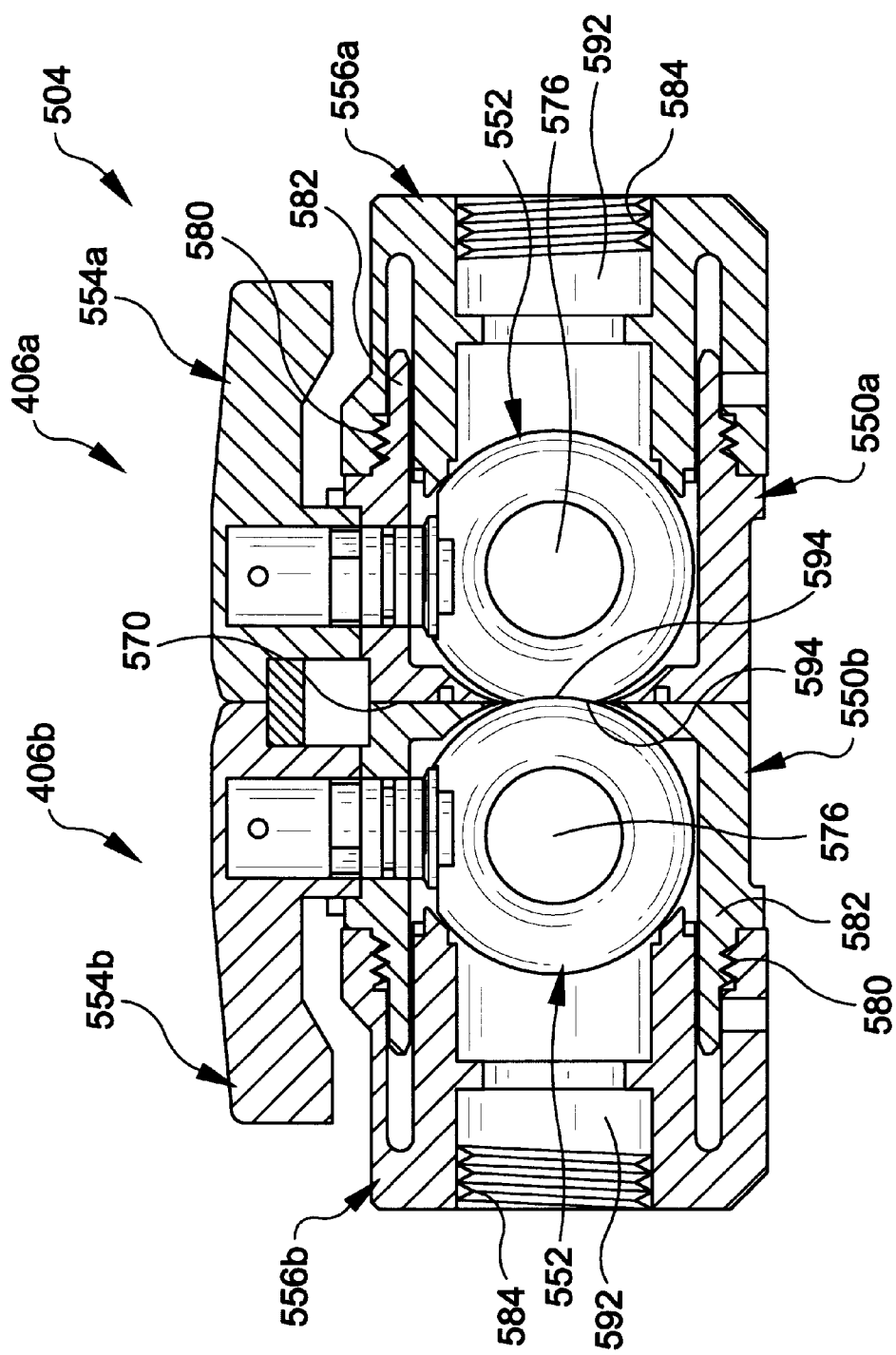
FIG. 5E is a sectional view of attached couplers having closed valves.

As shown, the valves 552*a–b* include sealing faces 594*a–b* which are aligned relative to the coupler faces 570*a–b* and coupler openings 572*a–b*. When couplers 406*a–b* are attached as shown in FIG. 5E), the coupler faces 570 and coupler openings 572 of adjacent couplers 406*a–b* mate. FIG. 5E illustrates the couplers 406*a–b* connected with the valves 552*a–b* in a closed position. As shown, when couplers 406*a–b* are connected and the valves 552*a–b* are in the closed position, the sealing faces 594*a–b* of the adjacent valve 552*a–b* mate thus eliminating the collection of trapped fluid between attached couplers 406*a–b*. In particular, since the sealing faces 594*a–b* of the valves 552*a–b* are aligned relative to the coupler faces 570*a–b* after the valves 552*a–b* are closed following operation, there is relatively no trapped fluid between the sealing faces 594*a–b* of closed attached couplers 406*a–b*. If the valve sealing faces 594 are not aligned with the coupler faces 570*a–b* and openings 572*a–b*, after the valves are closed, fluid collects between the valve sealing faces 594*a–b* and the coupler faces 570*a–b* of attached couplers which would be released when the couplers are detached. Thus, the construction of the couplers described eliminates the release of fluid when the product deliver line 503 is detached from the container 180.

In a preferred embodiment of the couplers 406*a–b*, the sealing faces 594*a–b* of adjacent valves of couplers 406*a–b* may be formed of cooperating structure to provide a seal between the sealing faces 594*a–b* of closed valves 552*a–b* of connected couplers 406*a–b* as illustrated in FIGS. 5C and 5E. In particular, one of said couplers 406*a–b* includes a recessed sealing face into which a rounded sealing face may be positioned. As will be appreciated, after a container 180 is filled, the couplers 406*a–b* of the container 180 and product deliver line 503 are closed via valve control members 554*a–b* so that fluid can no longer flow through the couplers 406*a–b*. Thereafter, the couplers 406*a–b* may be detached for operation. Since the sealing faces 594*a–b* of the valves 552*a–b* are aligned relative to the coupler faces 570 which abut when the couplers 406*a–b* are attached, ideally no fluid will leak from the detached, closed couplers 406*a–b*.

FIG. 5D illustrates a coupler 406 with the valve 552 in the opened position. It should be noted that during operation, valve 552 would not be opened unless the couplers 406 were attached. As shown, when the valve 552 is opened, valve bore 576 aligns with throughbore 592 to provide a continuos conduit from the product deliver line 503 or the product container 180. A coupler of the type described for providing the no-drip feature for detached couplers is available from Tithill Corporation, Fill-Rite Division, Fort Wayne Ind. under the trade name SureStop (Trademark) Dry Disconnect.

This shuttle tank concept is based upon the idea that access is gained to the container 180 or tank (receiving medium) and the bulk or packaged product tank or container 502 (filling medium) through a series of "dry lock" couplings 406 as described that are closed to the atmosphere and are 'no drip' or 'no spill' by design. This concept also includes reversing this process to return unused (undiluted), product back into the product source 502. As stated hereinbefore, an important aspect of this inventive concept is that the product container 180 be dedicated to only one product for a given period of time (determined by the operator). The operator may choose to have multiple containers 180 available for one or more products. It will readily be appreciated by those skilled in the art that since the tank 180 is dedicated to one product, the only time the tank 180 needs be cleaned or rinsed, is when the operator chooses to switch products for which this tank 180 is dedicated. This is advantageous over known systems since the rinsing can be done at the operator's discrepancy under controlled conditions. This feature eliminates the need for in-field tank rinsing and eliminates hazardous residue on a daily basis which enables the operator to become more efficient in both operating safely and lowering operating expenses. Diluted product rinsate (concentrated product mixed or diluted with water or fertilizer, for example), that is left over after spraying is an environmental hazard that is costly in many ways. It is apparent that if an operator never has to dilute the product (until it is delivered to the dispensing apparatus 214), then the instance of left over rinsate is eliminated. Any left over product in the shuttle container 180 is undiluted and can be reused or transferred back into the product source 502 for use at a later date.

Figure 6:
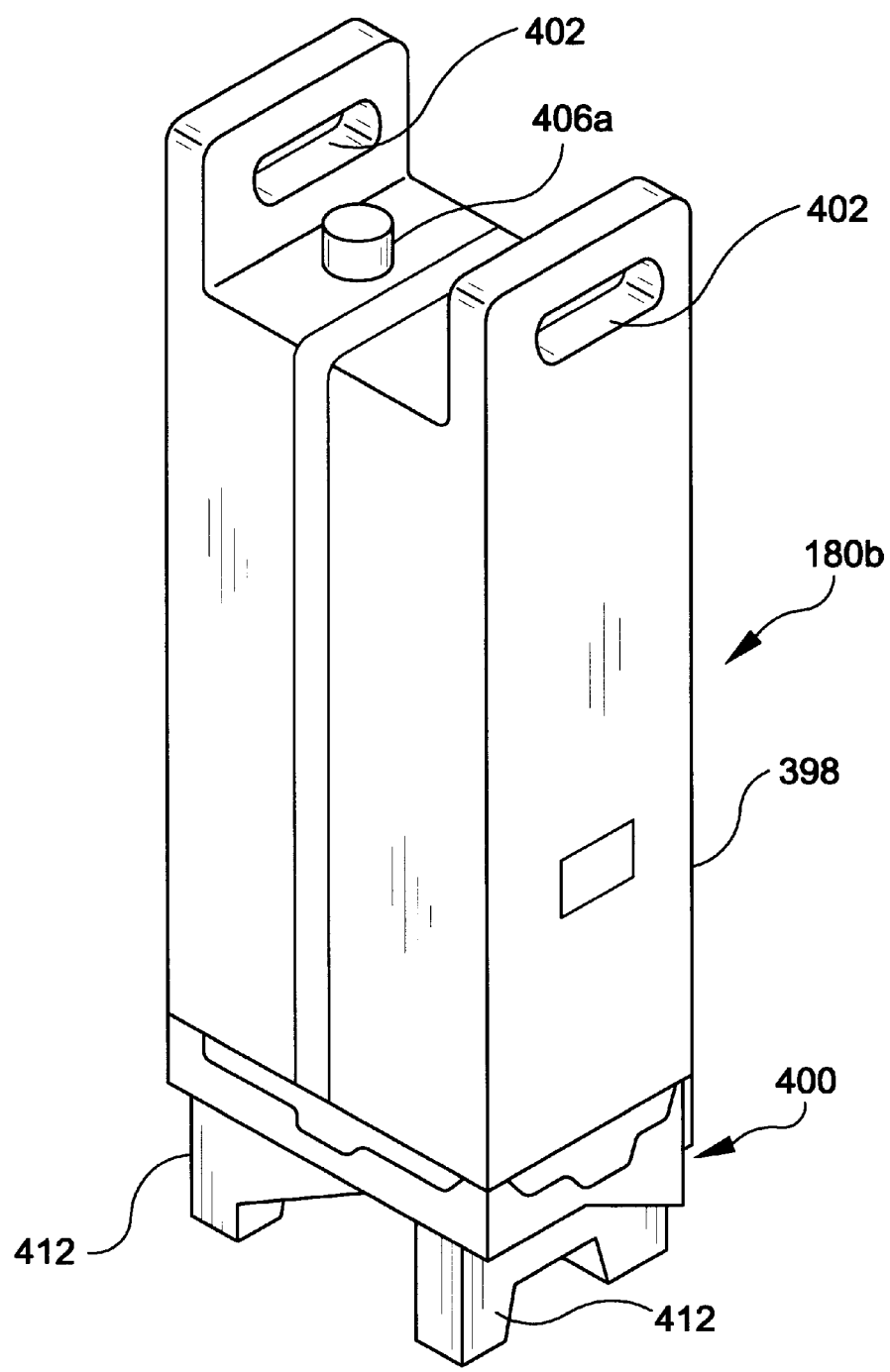
FIG. 6 is a perspective view of the closed transfer product shuttle tank shown in FIGS. 4a and 4b, showing one preferred tank shape.

FIG. 6 illustrates a perspective view of one preferred embodiment of the product container 180*b* similar to that shown in FIGS. 4B—4B illustrating the modular concept of the present invention. Preferably, the cross-sectional area of tank or container 180 is such that the tank 180 capacity (in gallons) equals the effective height of the tank 180 (in inches). The only difference between various tank 180 sizes then, is the height of the tank 180.

Figure 7:
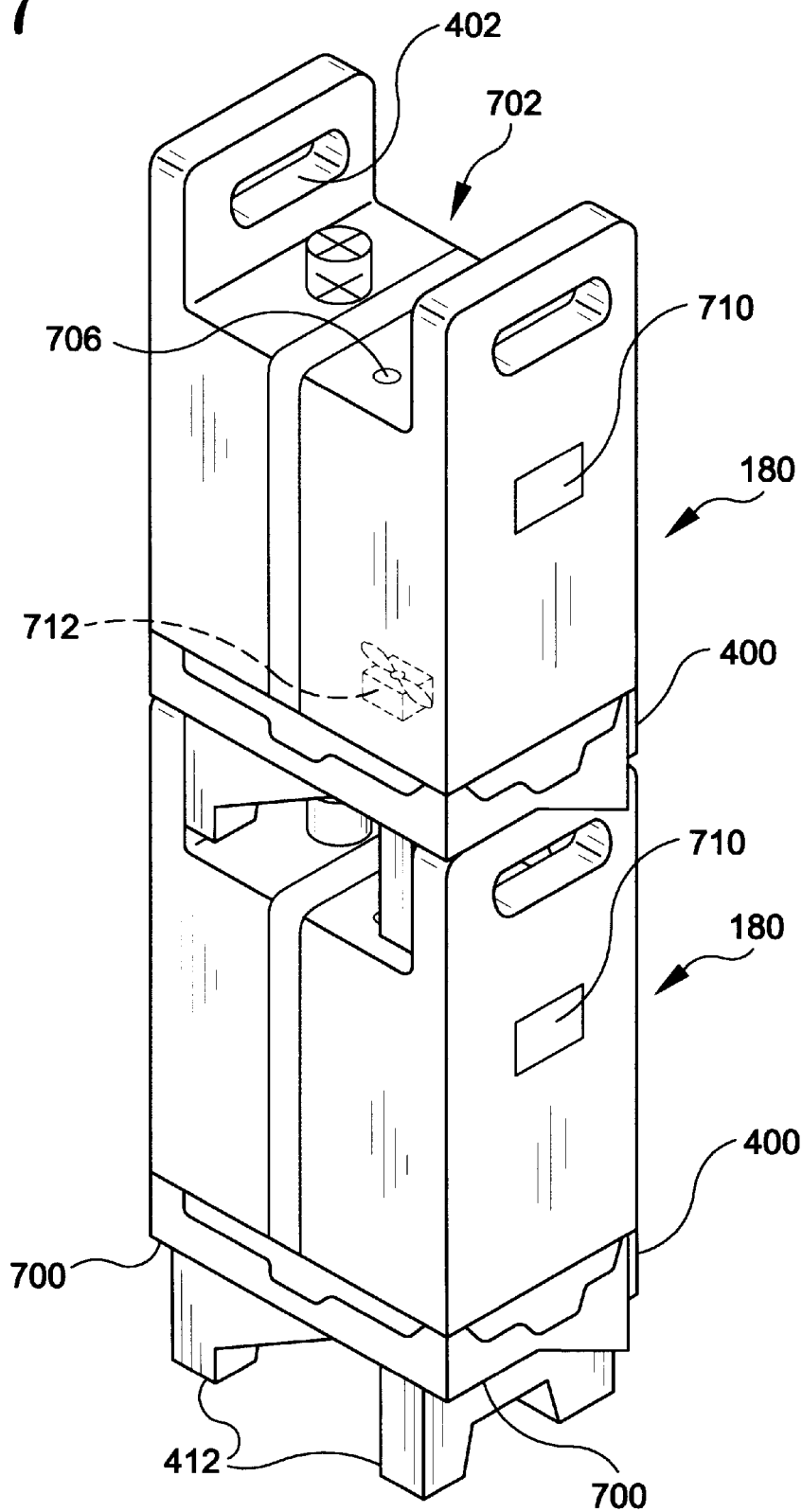
FIG. 7 is a perspective view illustrating the stacking feature of the closed transfer product shuttle tank, depicted in FIGS. 4a and 4b.

FIG. 7 illustrates the feature of stacking multiple containers 180. As shown, legs 412 of the base 400 are recessed from an outer edge of the container 180 to define a stacking ledge 700 which rests on the handles 402 of a lower container 180. As shown legs 412 of a stacked container 180 extend down into a stepped upper surface 702 of a lower container 180. Preferably, tank 180 includes grab handles 402 on the upper portion of the tank 180, formed such that a fork lift can easily slide through the handles 402 for tank 180 handling. Tank 180 can optionally be provided with a threaded indentation for adding a tank level sensor 706 in a manner familiar to those skilled in the art. It will readily be appreciated to those skilled in the art that the tank 180 should include vents, preferably, with check valves to prevent liquid spillage in the event of a tip-over.

Looking again at FIG. 7, tank 180 can be seen to include a removable color card or label holder 710 for added tank 180 flexibility of use. It is preferable that tank 180 include a built-in mechanical agitation device 712 that will permanently remain within the tank 180. The importance of such an agitator device 712 readily becomes apparent when one skilled in the art realizes that the agitator device 712 often becomes immersed in the product. Preferably, device 712 is powered by a 12 volt DC motor that is easily detachable from the tank 180 for remaining with the vehicle.

Figure 8:
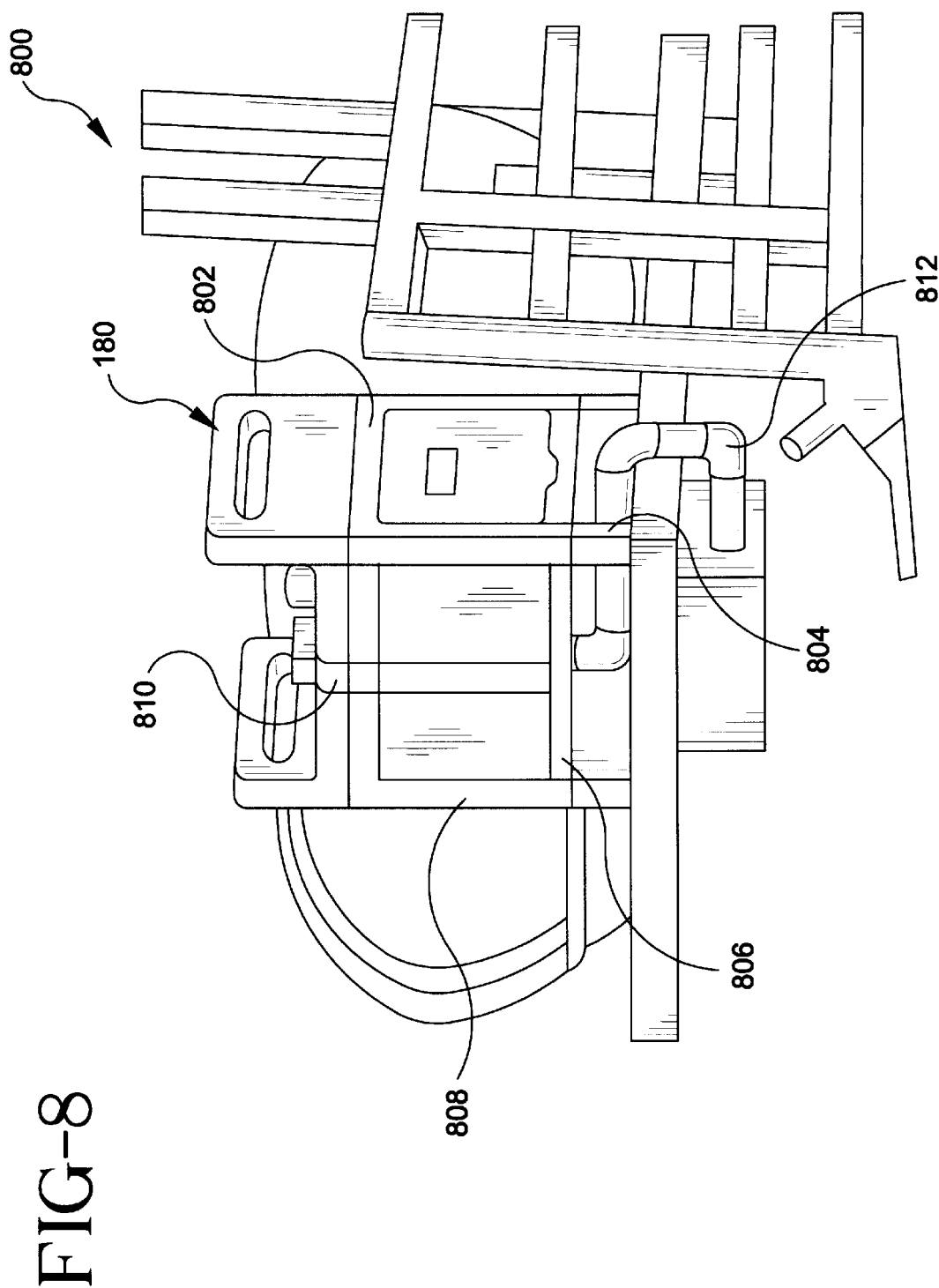
FIG. 8 is a perspective view of the closed transfer product shuttle tank mounted to a tank receiver or stand on board a vehicle sprayer.

FIG. 8 illustrates one preferred embodiment for a shuttle container 180 such as that previously shown mounted on-board a vehicle sprayer 800 (partially shown). Tank 180 fits securely into a tank stand 802 securely mounted to the vehicle 800. The tank stand or receiver 802 includes legs 804, a base 806 and sides 808. The base 806 and sides 808 are sized relative to the dimensions of the container 180 so that the container 180 fits therein. In particular, since the base of the containers 180 is uniform, the base 806 of the tank stand 802 is sized relative to the base of the containers 180 to support the containers 180 during operation. Hold down means, such as a hold down strap 810, is preferably used to secure the tank 180 to the tank stand or receiver 802. As shown, a product dispensing line is connected to the container 180 via coupler 406a' as previously described.

Looking again at FIG. 8, The present invention preferably includes a closed product transfer system as described hereinbefore, which includes a dedicated and reusable product shuttle tank(s) 180 and a modular "systems" design approach to incorporating important tank 180 features, also described hereinbefore. Those skilled in the art will readily appreciate the important gap filled between the product companies' diverse packaging strategies and the ability of the product applicator to safely deliver products to the field. A dedicated, reusable product shuttle tank 180 system on a mobile crop sprayer 800, for example, will have a significant, positive impact on the ability of the product applicator (operator) to deliver products and pesticides, for example, to the field safely and efficiently. The closed product transfer system described hereinbefore makes it easy to be safe and environmentally friendly.

Looking again at FIG. 2, one preferred embodiment for a product dispensing system 108b with in-line metered 204 flow feedback, suitable for use with the present inventive comprehensive product delivery system, is illustrated. As stated hereinbefore, an in-line flow metering concept will offer real-time dynamic product flow control capability to a closed loop control system. Together with a precision triple diaphragm pump 202, a PWM motor controller 206, and an in-line injection tube 216 illustrated in FIG. 9, the in-line flow metering provides the product dispensing system 108b with more accurate, reliable and faster response for product injection applications, also as stated hereinbefore.

It will be appreciated by those skilled in the art that metering accuracy for product injection applications becomes an increasingly important issue due to low injection flow rates and the cost of highly concentrated products, e.g. chemicals. For a closed loop product injection control system, a motor speed has generally been used as a reference measurement for product flow rates and as a feedback signal to a controller. The number of revolutions per minute (rpm) of a motor was typically calibrated with respect to the product discharge rates from a pump which led to numerous problems, including, but not necessarily limited to: 1) At a constant motor rpm, the metering pump, usually a positive displacement pump, discharges a fixed product flow rate. However, when the pump and/or the plumbing has any leakage, clog, or priming problems, the controller will receive a fault feedback signal by reading the constant rpm, which will cause under application of chemicals; 2) Different products have different viscosities. Even for a known product, its viscosity will change with temperature. The variation in viscosity may affect the pump's output by a ±10%–18% of full scale for a given motor rpm. This inaccuracy range is not acceptable for injecting highly concentrated products for spraying applications; and 3) To reduce an inaccuracy range down to ±5%, Re-calibration of the injection system is required when changing different viscous chemicals, or when the product tank is run empty and refilled for the next operation (due to the pump priming problems). The present invention overcomes these problems by monitoring the actual flow rate, and controlling the motor 208 rpm accordingly.

FIG. 2, described in more detail hereinafter, illustrates one preferred embodiment for the inventive closed loop product dispensing system suitable for use in product injection applications such as the present inventive comprehensive product dispensing system. The in-line flowmeter 204 offers real-time dynamic product flow control. Together with a precision triple diaphragm pump 202, a PWM motor controller 206, and an in-line injection tube 216, the in-line metered flow feedback provides the product dispensing system 108b with more accurate, reliable and faster response for product injection applications, as stated hereinbefore. The controller 206 compares a target flow rate (corresponding to the vehicle ground speed) with the actual product flow rate (feedback signal). Based on the measured error, the controller 206 will alter the motor 208 speed via, for example, a PWM motor driver to ensure actual flow rate matching the target flow set point.

As stated hereinbefore, the great advantage of using a triple diaphragm pump is that for a given flow rate, a triple diaphragm pump has much less pulsation flow than a single and/or dual piston pump, so that the injection system can evenly distribute products to the spraying nozzles on a timely basis. The diaphragms inside the pump 202 separate the products from the moving parts of the pump 202, so that the pump 202 can be run dry in case of running out of products in the product container 180. The in-line flowmeter 204 makes the product dispensing system able to accurately monitor the actual product flow rate within a wide range of viscosity, and notifies the operator immediately in the case of loss of product flow. The response time and accuracy of the closed loop product dispensing system 108b are greatly enhanced by the PWM motor driver, and the product injection tube 216 protruding into the product/carrier dispensing line 212 streamline as shown in FIG. 2.

Figure 9:
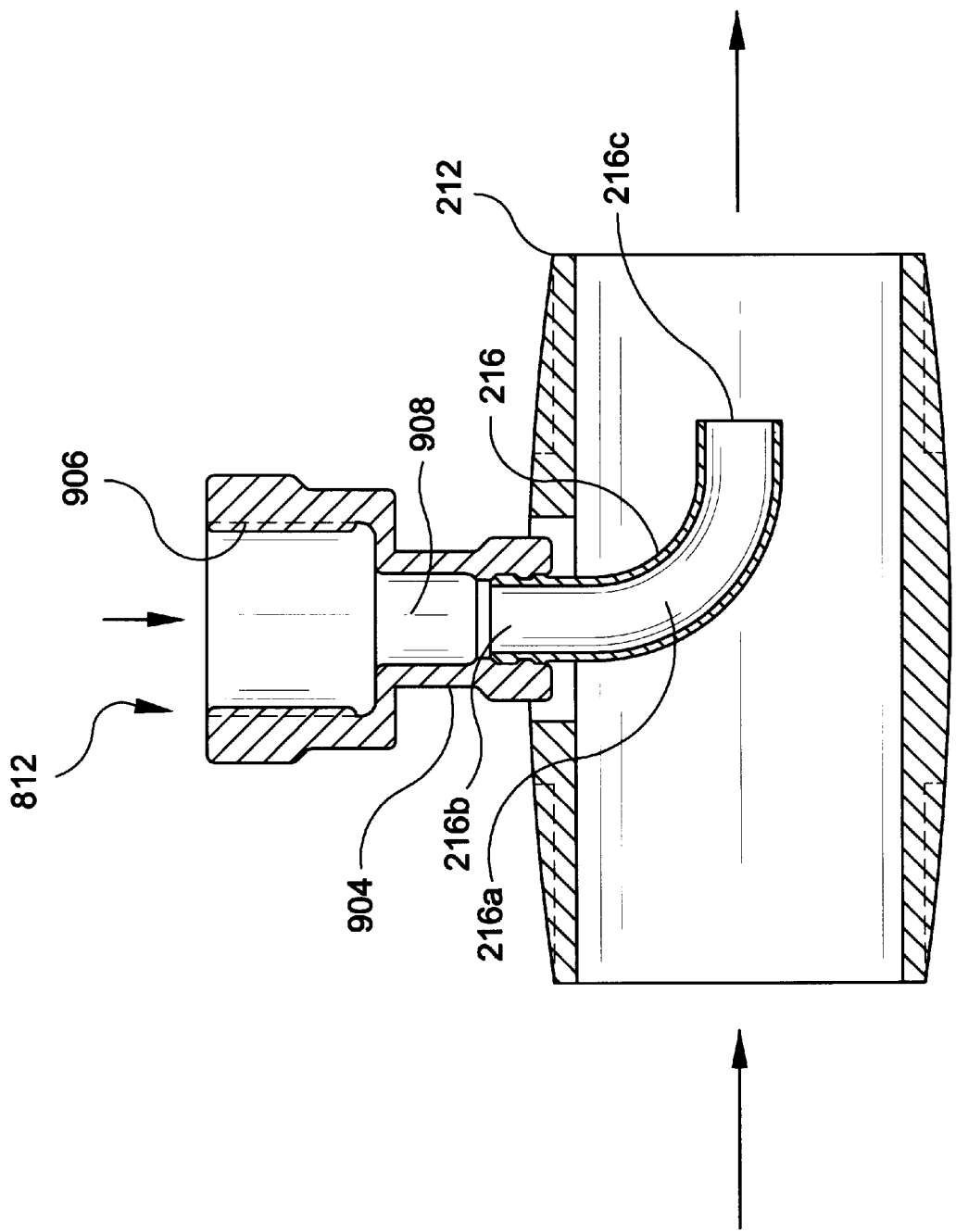
FIG. 9 is a diagram illustrating one preferred embodiment for an injection tube for injecting product into a carrier/product dispensing line, suitable for use with the present inventive product delivery system.

FIG. 9 illustrates in more detail, the product injection tube 216, including one preferred embodiment in accordance with the present invention. Injection tube 216 was adapted to ensure complete delivery and mixing of liquid injected into the product/carrier dispensing line (conduit) 212 by improving injection quality for product injection applications, especially for those applications having extremely low injection flow rates. The embodiment depicted in FIG. 9 is pressurized to approximately 40–70 psi, depending on the flow rates, at the product injection point. The present invention is not so limited, however, and it will be appreciated that other pressures will also be effective in a particular application having characteristics unique to that application.

As shown in FIG. 9, the injection tube 216 is coupled to the product dispensing line 812 via a stepped conduit connector 904 including a first diameter portion 906 and second smaller diameter portion 908. The product dispensing line 812 is coupled to the stepped conduit connector 904 within the first diameter portion to define a continous flow conduit therethrough through the product dispensing line 812 and injection tube 216.

In prior constructions where the product dispensing line 812 was not coupled to the product/carrier dispensing line 212 via an injection tube 216, but rather a "T" connection was employed between the product dispensing line 812 and product/carrier dispensing line 212 back pressure was likely to develop in the system and the system had limitations including, but not necessarily limited to: 1) These high pressures require higher pressure on the product injection pump 202 to inject products into the product/carrier dispensing line 212, which may lead to a higher liquid slippage inside the product pump 202; and 2) There will be some vortex disturbances at the stepped transition between the first diameter portion and the second diameter portion, consequently causing an uneven delivery and/or a longer time delay of the product into the product/carrier dispensing line 212. Injection tube 216, described in more detail hereinafter, improves product injection quality by removing the problems identified hereinbefore.

Most preferably, a 90° injection tube 212 is protruded into the product/carrier dispensing line 212, such that the inlet 216b and outlet 216c are aligned 90° relative to one another. Additive liquid (chemicals) will be injected through the outlet 216b of the tube into the carrier liquid. The outlet 216c of the injection tube 216 is preferably located in the centerline of the conduit of the product/carrier dispensing line 212 and the outlet 216c is aligned relative to the product injected liquid stream so that the injected product liquid stream is parallel to the carrier liquid stream lines. Since the outlet 216c of injection tube 216 is surrounded completely by the carriers liquid, all liquid injected out of the tube 216 is carried away without trapping any amount of the liquid anywhere inside the conduit 212 so that proper carrier/product mixing is achieved. In this manner, it is ensured that all the additive liquid injected into the product/carrier dispensing line 212 will be carried out toward an in-line mixer if included 213. The effect of vortex disturbances on injected flow will thus be eliminated and the injection and mixing quality improved, especially for low product applications rates.

Also since the product is injected in alignment with the flow stream of carrier fluid in the carrier/product dispensing line 212 there is less turbulence at the mixing point. It is important to note that injection tube 216 and conduit 212 have a fixed inside diameter respectively so that the restriction or pressure drop in the injection and carrier plumbing is minimized. In one preferred embodiment, conduit 212 has male threads on both ends, and the injection tube 216 has female threads for easy connection in existing liquid plumbing systems.

This invention has been described herein in considerable detail in order to comply with the Patent Statutes and to provide those skilled in the art with the information needed to apply the novel principles and to construct and use such specialized components as are required. However, while a particular embodiment of the present invention has been described herein in detail, it is to be understood that various alterations, modifications and substitutions can be made therein without departing from the spirit and scope of the present invention, as defined in the claims which follow. For example, it will be appreciated that the comprehensive product delivery system has principles that may be applied to product delivery systems in general, and thus is not necessarily limited to application of products in the agronomic industry.

What is claimed is:

1. A closed-transfer delivery system for transferring a product to a dispensing system carried on a mobile dispensing device, the dispensing system including a dispensing mechanism for spreading the product over a desired spread area, the closed-transfer delivery system comprising:
   a product source having an opening and adapted to provide a product, the product source remaining generally stationary relative to the mobile dispensing device;
   a product container having an opening for introducing the product into the product container, the product container being removably mounted on the mobile dispensing device;
   a product delivery line operatively connected to the dispensing mechanism and removably connectable to the product container so as to fluidly communicate between the product container and the dispensing mechanism;
   a transfer line for fluid communication of the product;
   a first closure member operatively connected to the transfer line and moveable between an open position and a closed position restricting passage of the product;
   a second closure member operatively connected to either the product container or the product supply and moveable between an open position and a closed position restricting passage of the product therethrough; and
   a control associated with the first closure member and the second closure member, the control adapted to control operation of the first closure member and the second closure member between the open position and the closed position wherein the first closure member and the second closure member are adapted to be moved to the closed position and the transfer line disconnected from the opening of at least one of the product source or the product container and wherein the product within the transfer line or at least one of the product source or the product container is not exposed when the transfer line is disconnected.

2. The closed-transfer delivery system of claim 1 wherein the first closure member and second closure member each comprise:
   a rotatable valve member having a throughbore, the rotatable valve member being rotatable such that in the open position the throughbore of the rotatable valve member is aligned with the respective opening, and in the closed position the throughbore of the rotatable valve member is generally not aligned with the respective opening.

3. The closed transfer delivery system of claim 2 wherein the rotatable valve member is generally spherical, and the rotatable valve member includes a recessed sealing surface such that the recessed sealing surface mates with a like sealing surface of the other like rotatable valve members.

4. A method for supplying a fluid from a product source to a dispensing system, the dispensing system being carried on a mobile dispensing device including a spray boom for spreading the product over a spread area, the product source being generally stationary relative to the mobile dispensing device and defining an opening therein, the method comprising the steps of:

providing a product container removably mountable on the mobile dispensing device and operatively connectable to the dispensing system, the product container defining an opening therein and having a first closure member disposed proximate to the opening and being operable between an open position and a closed position to restrict the flow of fluid therethrough, the first closure member initially being in the closed position;

providing a delivery line having a first end and a second end, the first end of the delivery line being operatively connected to the product source in fluid communication with the opening thereof, the delivery line including a second closure member disposed proximate to the second end and being operable between an open position and a closed position to restrict the flow of the fluid therethrough, the second closure member initially being in the closed position;

coupling the delivery line to the product container in fluid communication with the opening thereof; and opening the first closure member of the product container and opening the second closure member of the delivery line to permit the fluid to flow from the product source through the delivery line and into the product container.

\* \* \* \* \*

UNITED STATES PATENT AND TRADEMARK OFFICE
Certificate

Patent No. 6,079,632

Patented: June 27, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Jianhua Yan, Prior Lake, Minnesota; Michael T. Vickers, Boise, Idaho; and Robert J. Monson, St. Paul, Minnesota.

Signed and Sealed this Thirtieth Day of October 2001.

DAVE SCHERBEL
*Supervisory Patent Examiner*
Art Unit 3752